US006480961B2

(12) United States Patent
Rajasekharan et al.

(10) Patent No.: US 6,480,961 B2
(45) Date of Patent: *Nov. 12, 2002

(54) SECURE STREAMING OF DIGITAL AUDIO/VISUAL CONTENT

(75) Inventors: Ajit V. Rajasekharan, East Brunswick, NJ (US); Guy A. Story, Jr., New York, NY (US); Andrew J. Huffman, Montville, NJ (US)

(73) Assignee: Audible, Inc., Wayne, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 146 days.

(21) Appl. No.: 09/261,055

(22) Filed: Mar. 2, 1999

(65) Prior Publication Data

US 2002/0004906 A1 Jan. 10, 2002

(51) Int. Cl.⁷ ................................................ G06F 11/30
(52) U.S. Cl. .................... 713/200; 709/227; 709/231
(58) Field of Search ................................ 713/200, 201, 713/202; 709/201, 203, 202, 208, 213, 217, 218, 223, 226, 220, 227, 231, 237; 380/4, 25, 20; 710/127

(56) References Cited

U.S. PATENT DOCUMENTS

| | | |
|---|---|---|
| 4,159,417 A | 6/1979 | Rubincam |
| D276,626 S | 12/1984 | Lockwood |
| 4,490,810 A | 12/1984 | Hon |
| 4,545,023 A | 10/1985 | Mizzi |
| 4,575,621 A | 3/1986 | Dreifus |
| 4,591,974 A | 5/1986 | Dornbush et al. |
| 4,601,011 A | 7/1986 | Grynberg |
| D289,777 S | 5/1987 | Thomas |
| 4,779,080 A | 10/1988 | Coughlin et al. |
| 4,855,725 A | 8/1989 | Fernandez |
| 4,899,292 A | 2/1990 | Montagna et al. |
| 4,916,441 A | 4/1990 | Gombrich |
| 5,065,345 A | 11/1991 | Knowles et al. |
| 5,091,939 A | 2/1992 | Cole et al. |
| 5,115,508 A | 5/1992 | Hatta |
| 5,121,492 A | 6/1992 | Saville, III et al. |

(List continued on next page.)

OTHER PUBLICATIONS

T. Watanabe, ET AL., "Visual Interface for Retrieval of Electronic–formed Books", IEEE, 1993, pp. 692–695.
B. Pobiak, "Adjustable Access Electric Books", IEEE, 1992, pp. 90–94.
R. Dvorak, ET AL., "A Methodology for User Centered Link Structures for Textbook to Hypertext Conversion", IEEE, 1992, pp. 619–628.
T. Steinert–Threlkeid, "Now, Data By Satellite", Inter@active Week.
D. Fischer, "This Little Computer Tries To Be A Book", St. Louis Post–Dispatch, Jan. 4, 1995, First Published by Bloomberg Business News, 1994.

(List continued on next page.)

Primary Examiner—Jeffrey Gaffin
Assistant Examiner—Rijue Mai
(74) Attorney, Agent, or Firm—Blakely Sokoloff Taylor & Zafman LLP

(57) ABSTRACT

A method and apparatus for secure streaming of digital audio/visual content is disclosed. Secure streaming provides protection against unauthorized use of the digital content. Authorization and integrity checks are performed by a client or playback device on a set of data associated with digital content to be played. The set of data includes authorization and integrity information for content to be received from the source. Streamed content is received from the source by the playback device. The streamed content is intermittently checked for authorization and integrity. If the check is passed, playback continues; otherwise playback is halted.

27 Claims, 5 Drawing Sheets

U.S. PATENT DOCUMENTS

| | | | |
|---|---|---|---|
| 5,133,076 A | | 7/1992 | Hawkins et al. |
| D330,544 S | | 10/1992 | Kane |
| 5,191,573 A | | 3/1993 | Hair |
| 5,203,001 A | | 4/1993 | Yanagiuchi et al. |
| 5,208,665 A | * | 5/1993 | McCalley et al. ............. 358/86 |
| 5,221,838 A | | 6/1993 | Gutman et al. |
| 5,226,080 A | | 7/1993 | Cole et al. |
| D339,329 S | | 9/1993 | Lacko |
| 5,319,582 A | | 6/1994 | Ma |
| 5,333,116 A | | 7/1994 | Hawkins et al. |
| 5,388,196 A | | 2/1995 | Pajak et al. |
| 5,442,789 A | * | 8/1995 | Baker et al. ................. 395/650 |
| 5,506,904 A | * | 4/1996 | Sheldrick et al. ........... 380/212 |
| 5,636,276 A | | 6/1997 | Brugger |
| 5,675,734 A | | 10/1997 | Hair |
| 5,734,719 A | * | 3/1998 | Tsevdos et al. ................ 380/5 |
| 5,734,823 A | | 3/1998 | Saigh et al. |
| 5,734,891 A | | 3/1998 | Saigh |
| 5,769,269 A | * | 6/1998 | Peters ........................... 221/7 |
| 5,809,144 A | * | 9/1998 | Sirbu et al. ................... 380/25 |
| 5,809,246 A | | 9/1998 | Goldman |
| 5,841,979 A | | 11/1998 | Schulhof et al. |
| 5,860,068 A | | 1/1999 | Cook |
| 5,918,213 A | | 6/1999 | Bernard et al. |
| 5,926,624 A | * | 7/1999 | Katz et al. ................... 709/217 |
| 5,931,901 A | | 8/1999 | Wolfe et al. |
| 5,963,916 A | | 10/1999 | Kaplan |
| 5,966,440 A | * | 10/1999 | Hair ............................... 380/4 |
| 5,969,283 A | | 10/1999 | Looney et al. |
| 6,002,720 A | * | 12/1999 | Yurt et al. ................... 375/240 |
| 6,005,938 A | * | 12/1999 | Banker et al. ................ 380/20 |
| 6,044,471 A | * | 3/2000 | Colvin ....................... 713/202 |
| 6,067,562 A | | 5/2000 | Goldman |
| 6,088,450 A | * | 7/2000 | Davis et al. ................... 380/25 |
| 6,141,693 A | * | 10/2000 | Perlman et al. ............. 709/236 |
| 6,157,929 A | * | 12/2000 | Zamiska et al. ............ 707/200 |

OTHER PUBLICATIONS

B. Ziegler, "IBM to Inveil Plan To Skip Disks, Send Software by Satellite", The Wall Street Journal, Nov. 1, 1994.

Nelson B. Heller & Associates, "Microtome to Deliver Publishers' Texts Electronically At Point of Purchase", The Heller Report, Oct. 1993, pp. 1 & 10, vol. IV, No. 12, Highland Park, IL, USA.

M. Cox, "Technology Threatens To Shatter the World Of College Textbooks", The Wall Street Journal, Jun. 1, 1993, vol. LXXIV, No. 160, Dow Jones & Compnay, Inc.

T. Romas, "Making Book On Electonic Books", College Store Journal, Sep./Oct. 1992.

* cited by examiner

SECURE STREAMING OF DIGITAL AUDIO/VISUAL CONTENT

FIELD OF THE INVENTION

The invention relates to digital information playback. More particularly, the invention relates to secure streaming of digital information between a source and a playback device.

BACKGROUND OF THE INVENTION

Sources currently exist that provide digital audio and/or video content to remote playback devices. The digital content can be provided by a network, such as the Internet, or other network. The digital content can be provided as a file that is downloaded and played, or as a stream of data that can be played as received. For digital content that is subject to a controlled distribution, a security scheme is required.

One scheme for content protection is to protect access to the content. Access protection can be applied to both files and streams of content. For example, a user name and password may be required to access the content. However, access protection can be defeated, for example, by disclosure of a user name and/or password, or by otherwise determining an authorized user name and password. Once an authorized user name and password are obtained, an unauthorized party can have access to the content.

Because access protection can be defeated as described above, additional and/or different content protection schemes are often necessary to provide satisfactory content protection. Therefore, what is needed is a protection scheme that provided better content protection than simple content access protection.

SUMMARY OF THE INVENTION

A method and apparatus for secure steaming of digital audio and/or visual content is described. Authorization data corresponding the digital content is received. A check is performed to determine whether a playback device is authorized to play the digital content based, at least in part, on the authorization data. A stream of data representing portions of the digital content is played, if authorized. In one embodiment, portions of the stream of digital content are intermittently checked for authorization.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method and apparatus for secure streaming of digital audio/visual content is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The invention provides a method and apparatus for allowing secure streaming of digital audio/visual content. Secure streaming provides protection against unauthorized use of the digital content. Authorization and integrity checks are performed by a client or playback device on a set of data associated with digital content to be played. The set of data includes authorization and integrity information for content to be received from the source. Streamed content is received from the source by the playback device. The streamed content is intermittently checked for authorization and integrity. If the check is passed, playback continues; otherwise playback is halted.

Figure 1:
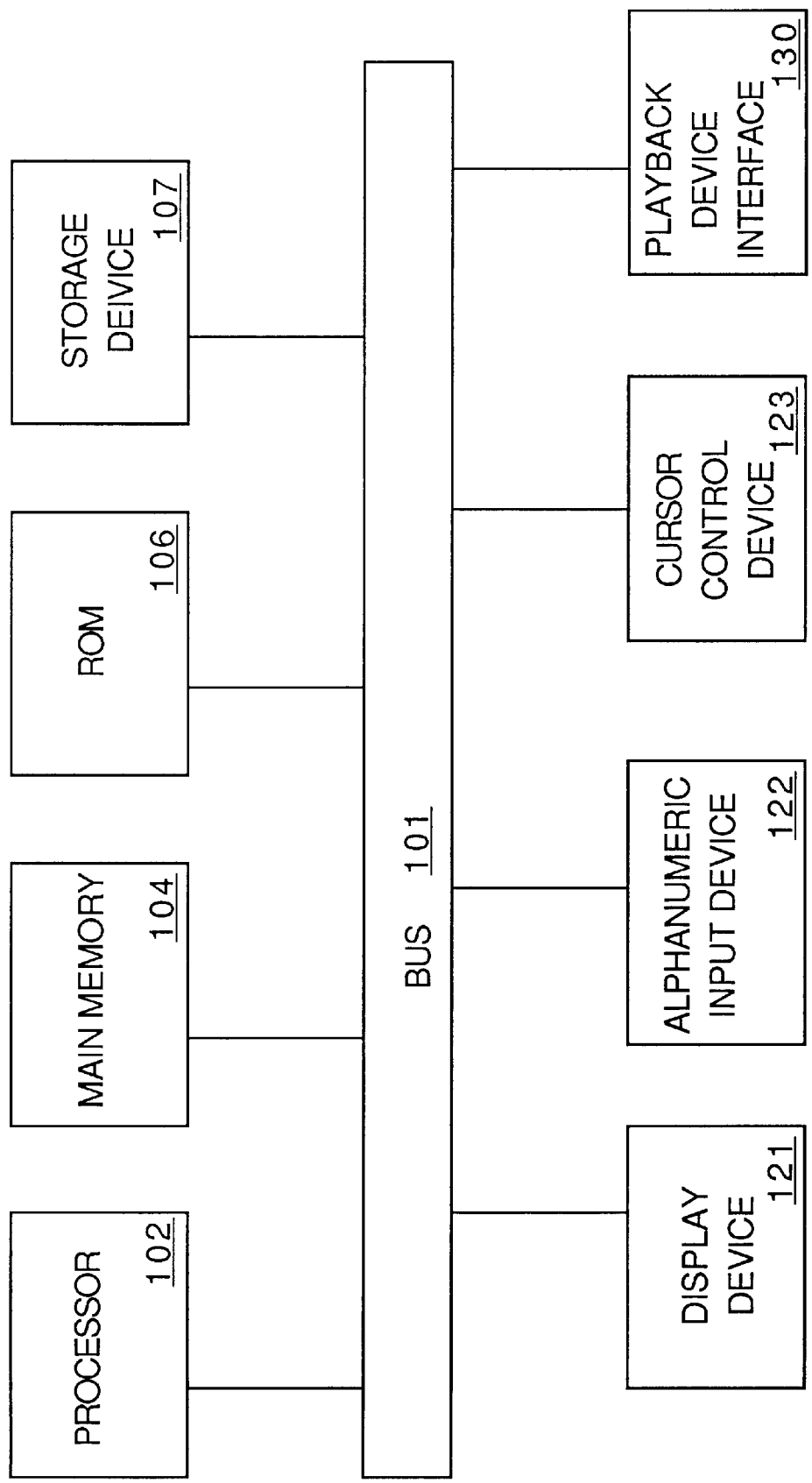
FIG. 1 is one embodiment of a computer system suitable for use with the invention.

Overview of an Architecture and Devices for Providing Playback of Digital Programming FIG. 1 is one embodiment of a computer system suitable for use with the invention. Computer system 100 includes bus 101 or other communication device for communicating information, and processor 102 coupled to bus 101 for processing information. While computer system 100 is illustrated with a single processor, computer system 100 can include multiple processors. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

In one embodiment, computer system 100 further includes playback device interface 130 that provides a communications interface between computer system 100 and a mobile playback device (not shown in FIG. 1).

Playback device interface 130 can be, for example, a docking station coupled to a port (not shown in FIG. 1) of computer system 100 (e.g., serial port, parallel port, SCSI interface). The docking station is configured to receive a mobile playback device. Playback device interface 130 allows computer system 100 to communicate licensing information, digital content, and other data to and receive data from a mobile playback device.

In one embodiment, the invention is related to the use of computer system 100 to provide secure streaming digital content playback devices. According to one embodiment, secure streaming is provided by a computer system, such as computer system 100, in response to processor 102 executing sequences of instructions contained in memory 104.

Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the invention. Thus, the invention is not limited to any specific combination of hardware circuitry and software.

Figure 2:
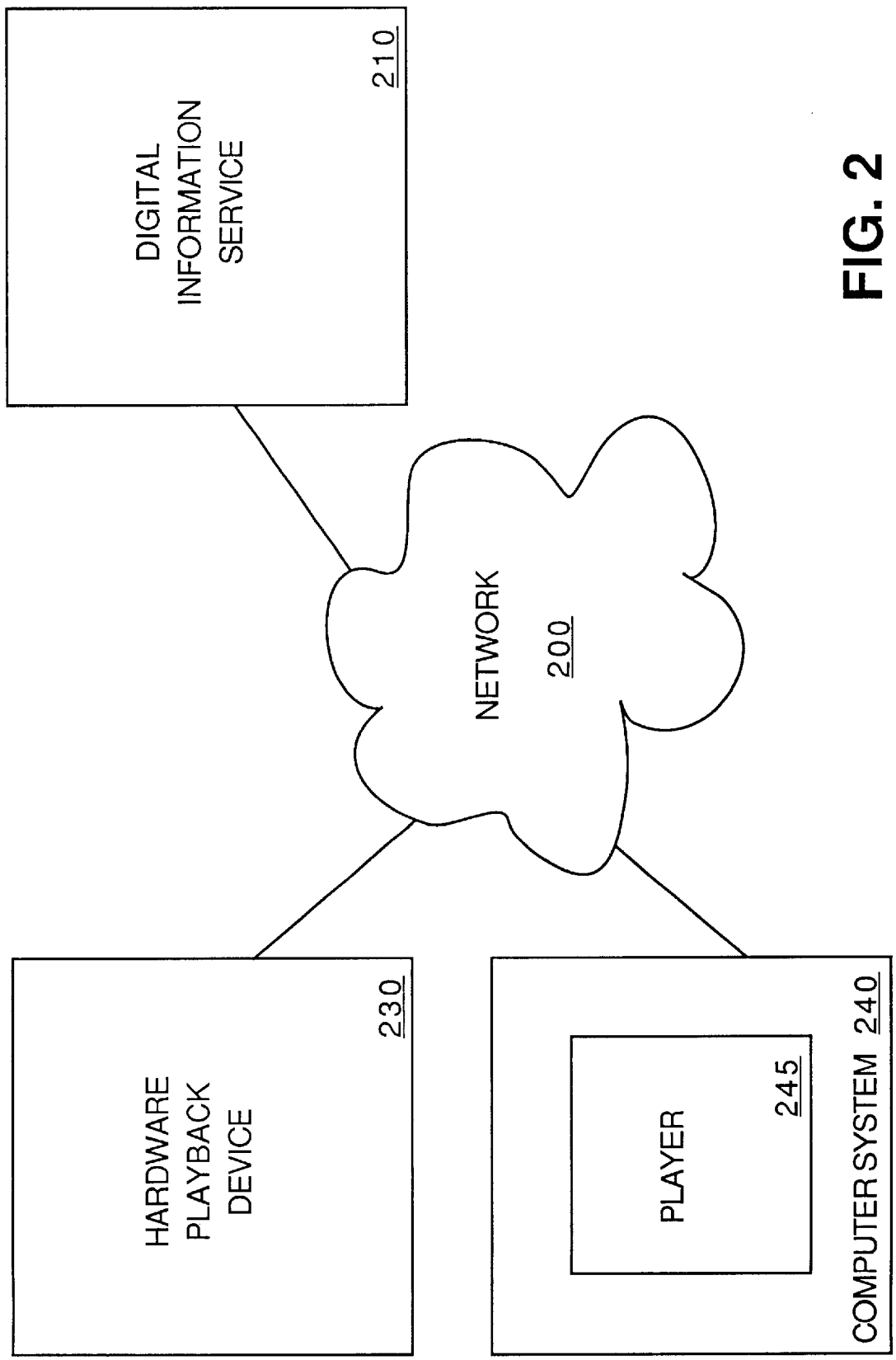
FIG. 2 is one embodiment of an architecture that provides digital information for playback suitable for use with the invention.

FIG. 2 is one embodiment of an architecture that provides digital information for playback suitable for use with the invention. Server 210 is coupled to multiple playback devices, including hardware playback devices (e.g., 230) and players (e.g., 245 running on computer system 240), by network 200. Any number of hardware playback devices and players can be coupled to server 210 by network 200.

In one embodiment, network 200 is the Internet; however, other networks can be used. For example, network 200 can be an intranet that couples only computer systems and other devices together that belong to a particular organization. Network 200 can also represent a group of networks, such and a group of local area networks.

Server 210 stores digital information defining programming as well as information about authorized users of the digital information. In one embodiment, server 210 stores a library of digital content that can be accessed by authorized playback devices. The library of digital content can include audio books, recordings of lecture series, news, plays, movies, etc.

Hardware playback device 230 stores programs from server 210 for playback. Hardware playback device 230 can store all or a portion of one or more programs. Also, hardware playback device 230 can be coupled to network 200 directly or by a computer system (not shown in FIG. 2) that accesses server 210. Computer system 240 runs player 245 and can play digital content from server 210.

Figure 3:
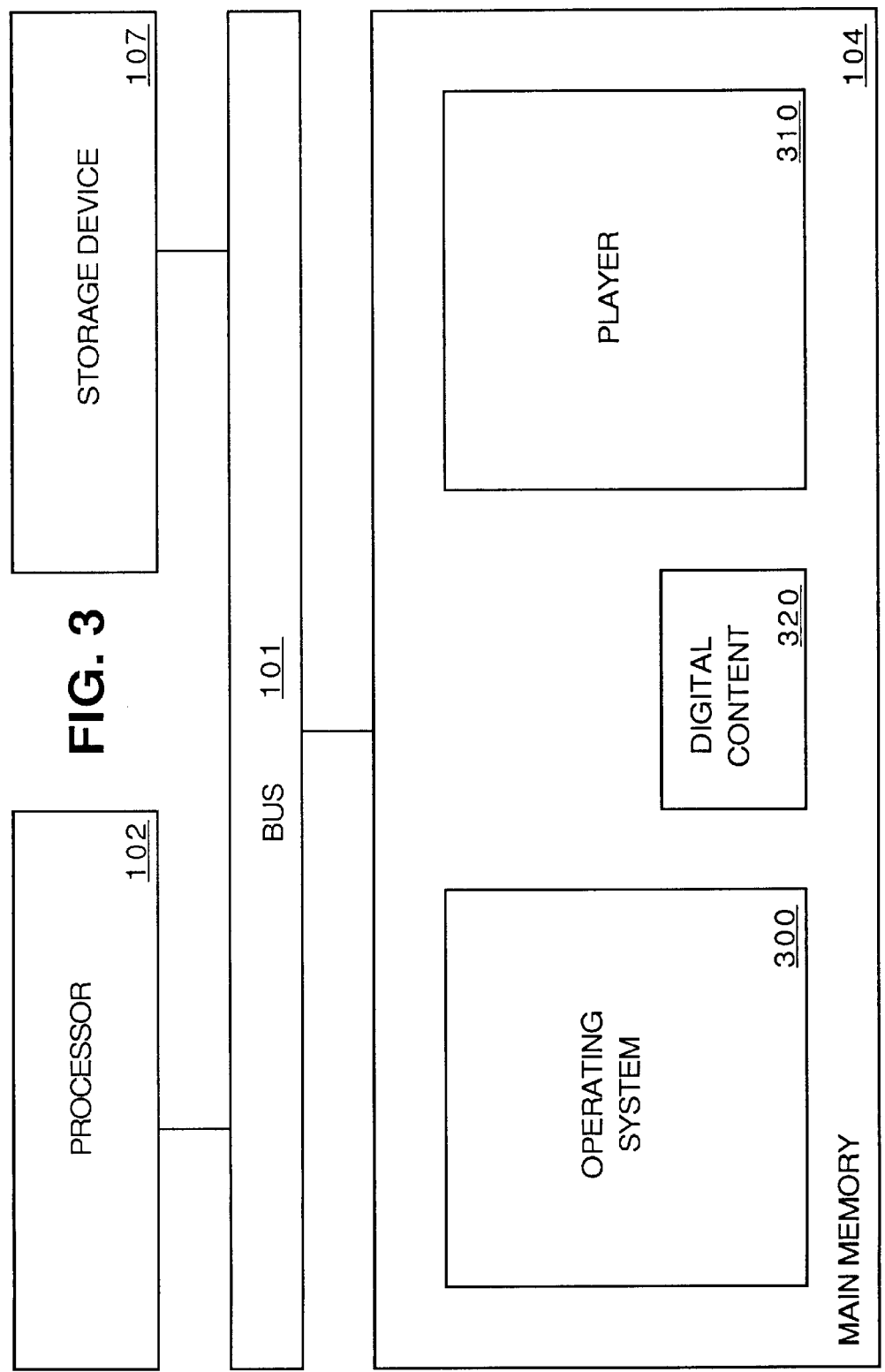
FIG. 3 is one embodiment of a computer system running a digital information player suitable for use with the invention.

FIG. 3 is one embodiment of a computer system running a digital information player suitable for use with the invention. Processor 102 executes sequences of instruction stored in main memory 104 including sequences of instructions defining operating system 300 and player 310.

Main memory 104 further includes digital content 320 that is all or a portion of programming received from the server. Additional programs, or additional portions of digital content 320, can be stored by storage device 107 and copied to main memory 104 as necessary. For streaming digital content, only a portion of the digital content being played is stored in main memory 104.

Processor 102 retrieves data from digital content 320 and outputs audio and/or video in response to the data. Processor 102 can also retrieve digital content data from a network connection (not shown in FIG. 3) for playback or for storage in main memory 104.

Overview of Secure Streaming of Digital Content

Figure 4:
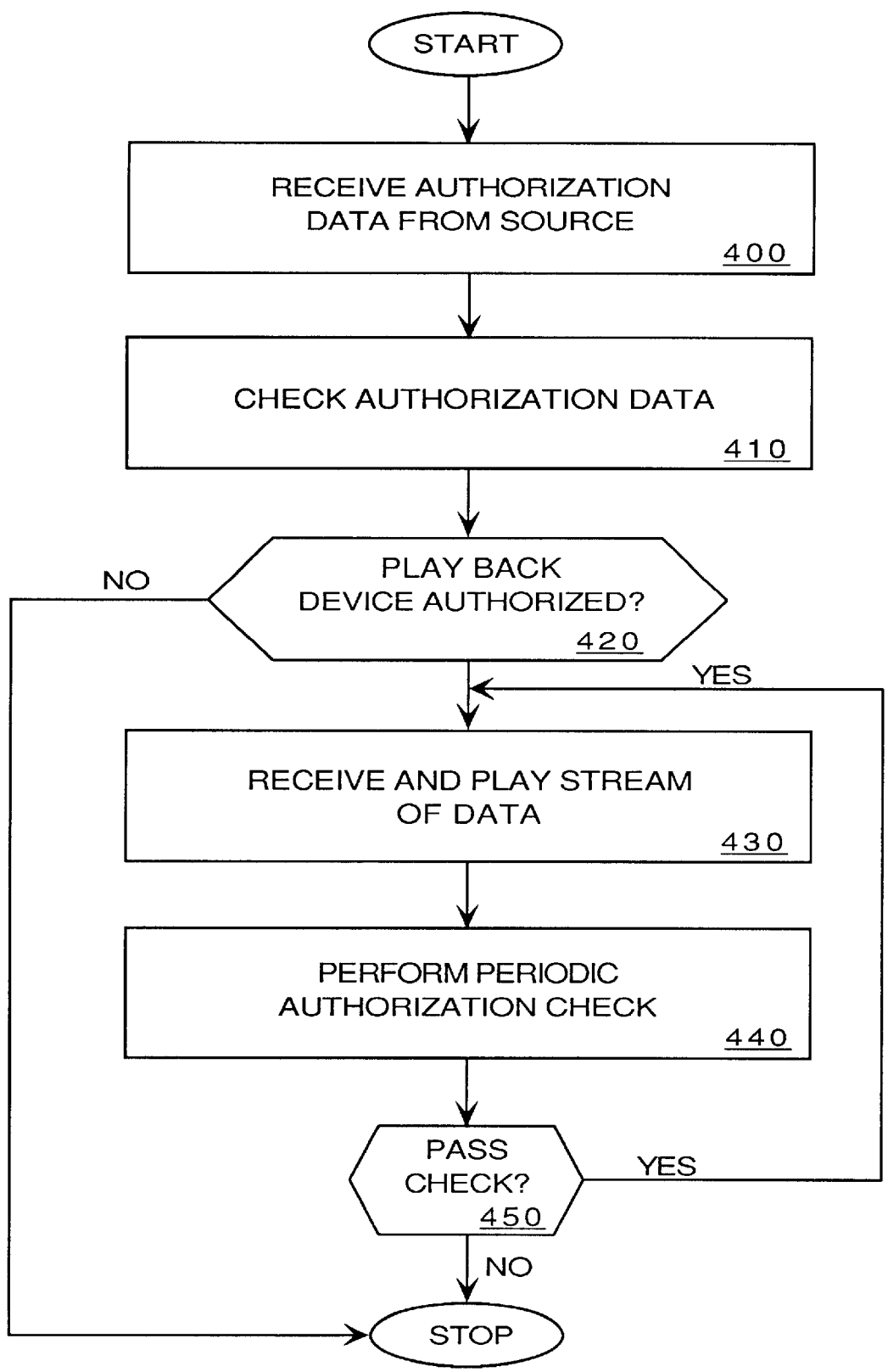
FIG. 4 is a flow diagram for providing secure streaming of digital content according to one embodiment of the invention.

FIG. 4 is a flow diagram for providing secure streaming of digital content according to one embodiment of the invention. The data can be audio data, visual data, or a combination of audio and visual data. The data can be played by a software player running on a computer system or other suitable device, or the data can be played by a dedicated hardware playback device.

Authorization data is received from a source at 400. In one embodiment, the source is a server computer system accessed via a network, such as the Internet. The server can provide the digital content as well as the authorization data, or the digital content can be received from a different source, or multiple sources. One embodiment of authorization data is described in greater detail below with respect to FIG. 5.

In one embodiment, the authorization data includes one or more digital signatures, one or more user identifiers and one or more content integrity values. Other and/or different authorization data can also be used. The one or more digital signatures allow the playback device to determine the authority of the source of the authorization data. The one or more user identifiers allow the playback device to determine whether the playback device is authorized to play the associated digital content. The content integrity values allow the playback device to determine whether the digital content is valid.

The playback device checks the authorization data at 410. In one embodiment, the playback device checks the digital signature, or other source indicator, in the authorization data to determine whether the authorization data is received from an authorized source. The digital signature can be, for example, either a Digital Signature Algorithm (DSA) signature as proposed by the National Institute of Standards, or a Rivest Shamir Adleman (RSA) algorithm as described by RSA Data Security, Inc. of Redwood City California. Both of these functions are described in pages 466–494 of "Applied Cryptography: Protocols, Algorithms and Source Code in C" by Bruce Schneier, published by John Wiley & Sons, Inc. (1996). Other signature algorithms can also be used.

The playback device determines whether it in an authorized playback device at 420. In one embodiment, the playback device has a PlayerID value. The PlayerID value can be received via a registration process, which is described in greater detail in U.S. patent application Ser. No. 09/151,384, filed Sep. 10, 1998, entitled "CLONING PROTECTION SCHEME FOR A DIGITAL INFORMATION PLAYBACK DEVICE," which is assigned to the corporate assignee of the invention. The PlayerID value can also be hardwired into, or otherwise provided by, a component of the playback device (e.g., a computer system, a hardware player).

If the playback device is not an authorized playback device at 420, the process stops. Otherwise, a stream of digital information is received and played at 430. In one embodiment, the stream of digital data is received form the same source as the authorization data; however, the digital data can be received from an alternative source.

In one embodiment, the playback device performs a periodic check of the stream of digital information at 440. The check can be performed at regular intervals (e.g., every 20 seconds), the check can be performed at random times, or the check can be performed at varying times within predetermined timing intervals. When performing checks at regular intervals conditions such as, for example, network bandwidth, processing power and strength of security desired, can be used to determine the interval to be used.

In one embodiment, the playback device generates a hash value based on a block of content received. The playback device checks the content integrity values previously received as part of the authorization data to determine whether the hash value is included. Content integrity values other than hash values can also be used.

If the check performed at 440 passes at 450, digital information playback is continued (e.g., 430, 440, 450). If the check fails at 450, playback of digital information is stopped. Thus, an unauthorized user can play a portion (e.g., 20 seconds) of unauthorized digital content, but the unauthorized user is prevented from continuing to play the stream of digital information.

Thus, the invention provides playback protection rather than access protection. In other words, the invention allows only authorized playback devices to play content that has been received. In contrast, access protection schemes attempt to limit access to the content that can be played by any playback device having access to the content. In providing playback protection, the invention allows greater protection to identification and authorization information as compared to access protection because authorization activities occur within the playback device rather than being distributed across a network where private information can be lost, stolen and/or sabotaged.

Figure 5:
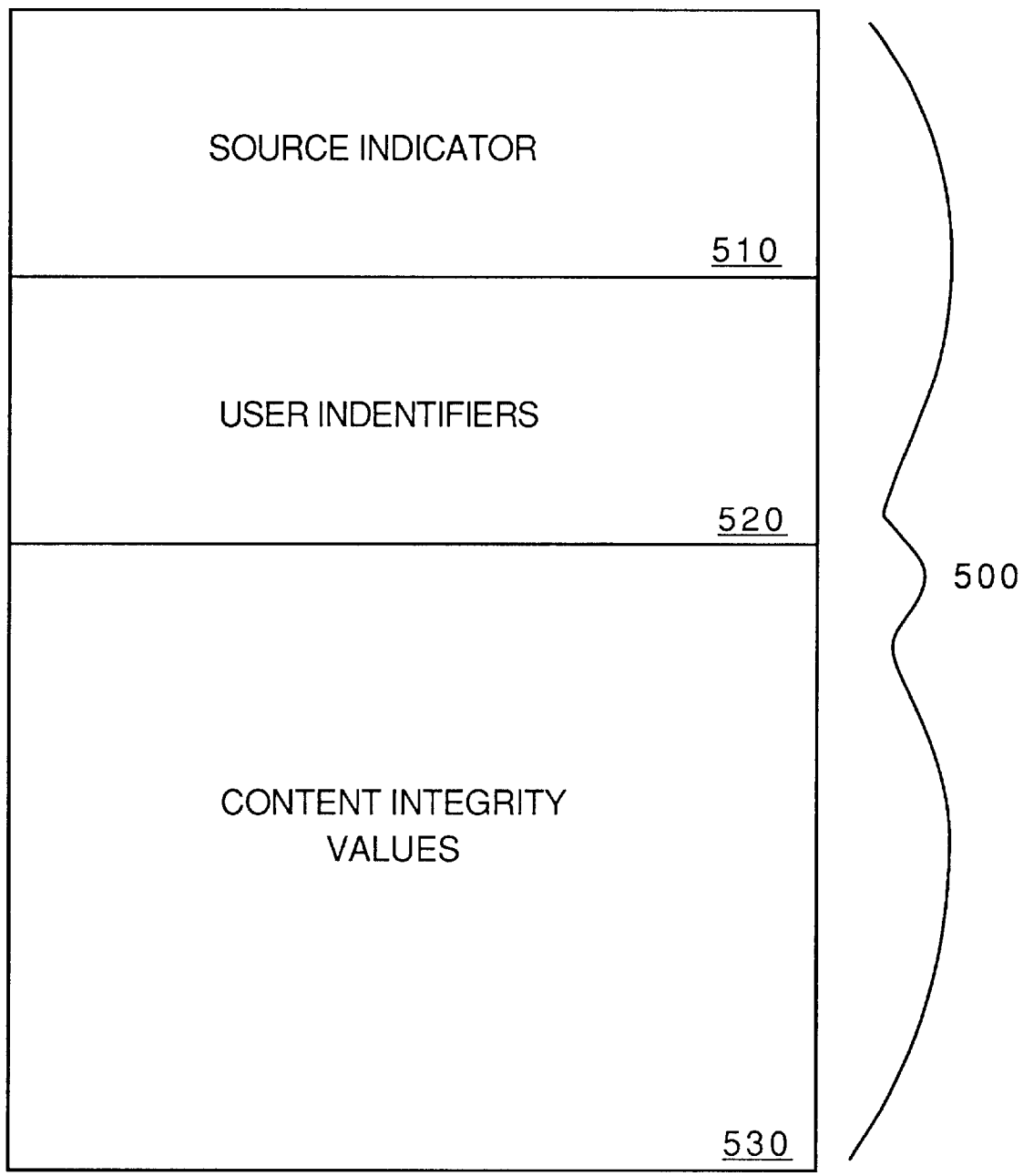
FIG. 5 illustrates authorization data for use in providing secure streaming digital content according to one embodiment of the invention.

FIG. 5 illustrates authorization data for use in providing secure streaming digital content according to one embodiment of the invention. In general, authorization data 500 includes source identifier 510, user identifiers 520 and content integrity values 530. Additional and/or different data can be used to provide authorization information.

In one embodiment, source indicator 510 is a digital signature corresponding to the source of authorization data 500. Source indicator 510 can also be multiple digital signatures indicating a chain of authorized sources through which the authorization data 500 has been received. Playback devices perform necessary checks on source indicator 510 to determine whether authorization data 500 is valid.

In one embodiment, user identifiers 520 include one or more PlayerID values corresponding to playback devices that are authorized to play the digital information with which authorization data 500 is associated. User identifiers 520 can also include GroupID values that correspond to groups of playback devices authorized to play the digital information. Playback devices determine whether a PlayerID or GroupID value linked to the playback device is included in user identifiers 520.

In one embodiment, content integrity values 530 are hash values corresponding to one or more portions of the digital content corresponding to authorization data 500. Content integrity values 530 are used by the playback device to determine whether the corresponding portion of digital content is valid. Content integrity values 530 are used for periodic checking by the playback device to determine whether playback is authorized.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   receiving authorization data corresponding to streamed digital content;
   determining whether a playback device is authorized to play the streamed digital content based, at least in part, on the authorization data;
   playing a portion of the streamed digital content, if authorized; and
   checking portions of the streamed digital content to determine whether continued playback is authorized, wherein an interval for which authorization is checked is determined based, at least in part, on one or more of network bandwidth, processing power utilization and strength of security desired.

2. The method of claim 1 wherein the checking is performed at regular intervals.

3. The method of claim 1 wherein the checking is performed semi-randomly.

4. The method of claim 1 wherein the checking comprises:
   determining a hash value for a portion of the steamed digital content;
   checking the authorization data to determine whether the hash value is included; and
   continuing playback if the hash value is included in the authorization data.

5. The method of claim 1 further comprising repeating determining whether the playback device is authorized to play the streamed digital content and playing a portion of the streamed digital content, if authorized.

6. The method of claim 1 wherein determining whether a playback device is authorized to play the digital content further comprises:
   determining whether a source indicator included in the authorization data indicates an approved source; and
   determining whether an authorization indicator in the authorization data corresponds to the playback device.

7. The method of claim 6 wherein the source indicator is a digital signature.

8. The method of claim 6 wherein the authorization indicator is a playback device indicator.

9. An apparatus comprising:
   means for receiving authorization data corresponding to streamed digital content;
   means for determining whether a playback device is authorized to play the streamed digital content based, at least in part, on the authorization data;
   means for playing a portion of the streamed digital content, if authorized, and
   means for checking portions of the streamed digital content to determine whether continued playback is authorized, wherein an interval for which authorization is checked is determined based, at least in part, on one or more of network bandwidth, processing power utilization and strength of security desired.

10. The apparatus of claim 9 wherein the means for checking further comprises:
    means for determining a hash value for a portion of the stream of data;
    means for checking the authorization data to determine whether the hash value is included; and
    means for continuing playback if the hash value is included in the authorization data.

11. The apparatus of claim 9 wherein the means for determining whether a playback device is authorized to play the digital content further comprises:
    means for determining whether a source indicator included in the authorization data indicates an approved source; and
    means for determining whether an authorization indicator in the authorization data corresponds to the playback device.

12. A machine-readable medium having stored thereon sequences of instructions that, when executed cause one or more electronic devices to:

receive authorization data corresponding to streamed digital content;

determine whether a playback device is authorized to play the streamed digital content based, at least in part, on the authorization data; and play a portion of the streamed digital content, if authorized; and check portions of the streamed digital content to determine whether continued playback is authorized, wherein an interval for which authorization is checked is determined based, at least in part, on one or more of network bandwidth, processing power utilization and strength of security desired.

13. The machine-readable medium of claim 12 wherein the checking is performed at regular intervals.

14. The machine-readable medium of claim 12 wherein the checking is performed randomly.

15. The machine-readable medium of claim 12 wherein the sequences of instructions that cause the one or more electronic devices to check portions of the stream of data further comprise sequences of instructions that when executed cause the one or more electronic devices to:

determine a hash value for a portion of the stream of data;

check the authorization data to determine whether the hash value is included; and continue playback if the hash value is included in the authorization data.

16. The machine-readable medium of claim 12 wherein the sequences of instructions that cause the one or more electronic devices to play the portion of the digital content comprises receiving a stream of portions of a digital content file.

17. The machine-readable medium of claim 12 wherein the sequences of instructions that cause the one or more electronic devices to determine whether a playback device is authorized to play the digital content comprise sequences of instructions that when executed cause the one or more electronic devices to:

determine whether a source indicator included in the authorization data indicates an approved source; and determine whether an authorization indicator in the authorization data corresponds to the playback device.

18. The machine-readable medium of claim 17 wherein the source indicator is a digital signature.

19. The machine-readable medium of claim 17 wherein the authorization indicator is a playback device indicator.

20. A computer data signal embodied in a data communications medium shared among a plurality of network devices comprising sequences of instructions that, when executed, cause one or more electronic systems to:

receive authorization data corresponding to streamed digital content;

determine whether a playback device is authorized to play the streamed digital content based, at least in part, on the authorization data;

play a portion of the streamed digital content, if authorized; and check portions of the streamed digital content to determine whether continued playback is authorized, wherein an interval for which authorization is checked is determined based, at least in part, on one or more of network bandwidth, processing power utilization and strength of security desired.

21. The computer data signal of claim 20 wherein the checking is performed at regular intervals.

22. The computer data signal of claim 20 wherein the checking is performed randomly.

23. The computer data signal of claim 20 wherein the sequences of instructions that cause the one or more electronic devices to check portions of the stream of data further comprise sequences of instructions that when executed cause the one or more electronic devices to:

determine a hash value for a portion of the stream of data;

check the authorization data to determine whether the hash value is included; and continue playback if the hash value is included in the authorization data.

24. The computer data signal of claim 20 wherein the sequences of instructions that cause the one or more electronic devices to play the portion of the digital content comprises receiving a stream of portions of a digital content file.

25. The computer data signal of claim 20 wherein the sequences of instructions that cause the one or more electronic devices to determine whether a playback device is authorized to play the digital content comprise sequences of instructions that when executed cause the one or more electronic devices to:

determine whether a source indicator included in the authorization data indicates an approved source; and determine whether an authorization indicator in the authorization data corresponds to the playback device.

26. The computer data signal of claim 25 wherein the source indicator is a digital signature.

27. The computer data signal of claim 25 wherein the authorization indicator is a playback device indicator.

* * * * *